United States Patent
Kagata

(10) Patent No.: US 9,512,327 B2
(45) Date of Patent: Dec. 6, 2016

(54) INK SET AND LIQUID DROPLET DISCHARGING APPARATUS

(71) Applicant: Seiko Epson Corporation, Tokyo (JP)

(72) Inventor: Takayoshi Kagata, Shiojiri (JP)

(73) Assignee: Seiko Epson Corporation (JP)

( * ) Notice: Subject to any disclaimer, the term of this patent is extended or adjusted under 35 U.S.C. 154(b) by 23 days.

(21) Appl. No.: 14/521,914

(22) Filed: Oct. 23, 2014

(65) Prior Publication Data

US 2015/0115202 A1   Apr. 30, 2015

(30) Foreign Application Priority Data

Oct. 25, 2013 (JP) ................................ 2013-221951

(51) Int. Cl.

| | | |
|---|---|---|
| *B41J 2/01* | (2006.01) | |
| *C09D 11/30* | (2014.01) | |
| *C09D 11/40* | (2014.01) | |
| *C09D 11/322* | (2014.01) | |
| *C08K 5/3417* | (2006.01) | |
| *C09K 11/64* | (2006.01) | |
| *C09D 175/04* | (2006.01) | |
| *C08K 5/5419* | (2006.01) | |
| *C09D 11/50* | (2014.01) | |

(52) U.S. Cl.
CPC ........... *C09D 11/322* (2013.01); *C08K 5/3417* (2013.01); *C08K 5/5419* (2013.01); *C09D 11/40* (2013.01); *C09D 11/50* (2013.01); *C09D 175/04* (2013.01); *C09K 11/64* (2013.01)

(58) Field of Classification Search
CPC ....... C09D 11/40; C09D 11/30; C09D 11/322; B41J 2/01
See application file for complete search history.

(56) References Cited

U.S. PATENT DOCUMENTS

| 6,011,098 A | 1/2000 | Kashiwazaki et al. |
|---|---|---|
| 2007/0191509 A1 | 8/2007 | Kobayashi |
| 2008/0145628 A1 | 6/2008 | Oyanagi et al. |
| 2008/0213518 A1* | 9/2008 | Oyanagi ............... C09D 11/101 428/34.1 |
| 2011/0050792 A1 | 3/2011 | Kagata et al. |

(Continued)

FOREIGN PATENT DOCUMENTS

| JP | 06-322306 | 11/1994 |
|---|---|---|
| JP | 2007-211176 A | 8/2007 |

(Continued)

*Primary Examiner* — Veronica F Faison
(74) *Attorney, Agent, or Firm* — Harness, Dickey & Pierce, P.L.C.

(57) ABSTRACT

An ink set according to the invention includes a first ink composition which contains a first coloring material, and a second ink composition which contains a second coloring material other than the first coloring material, in which the first coloring material is at least one of a white coloring material formed of second particles with an average particle diameter of 200 nm or more to 1 μm or less formed by collecting a plurality of first particles with an average particle diameter of less than 200 nm, or a photoluminescent pigment with a specific gravity of 2.0 or more, and the viscosity of the first ink composition at 20° C. is 1.3 times or more with respect to the viscosity of the second ink composition at 20° C.

6 Claims, 4 Drawing Sheets

(56) References Cited

U.S. PATENT DOCUMENTS

2014/0287206 A1* 9/2014 Sasada .................. B41J 2/01
428/207

FOREIGN PATENT DOCUMENTS

| JP | 2008-174712 A | 7/2008 |
| JP | 2011-051188 A | 3/2011 |
| JP | 2012-025893 A | 2/2012 |
| JP | 4958001 B2 | 6/2012 |

* cited by examiner

LIQUID FEEDING OPERATION   LIQUID SUCTIONING OPERATION

INK SET AND LIQUID DROPLET DISCHARGING APPARATUS

BACKGROUND

1. Technical Field

The present invention relates to an ink set and a liquid droplet discharging apparatus having the same.

2. Related Art

In the related art, various colored images are formed on recording media using color inks such as cyan ink, magenta ink, yellow ink, and black ink. In recent years, inks which are able to form color images which are not able to be expressed simply by using these color inks have attracted attention. For example, JP-A-2008-174712 discloses forming a photoluminescent image using a photoluminescent ink composition which contains a photoluminescent pigment (for example, gold dust or silver dust made from brass, aluminum fine particles, or the like). In photoluminescent images, it is possible to express photoluminescence which is generated by the luster of metals or the like by using photoluminescent pigments such as metal pigments. In addition, JP-A-6-322306 discloses a white ink composition which contains a white coloring material such as titanium dioxide. This white ink composition is able to form a white image which it is not possible to form with the color inks described above.

Here, when the white coloring material represented by titanium dioxide described above does not have a particle diameter with a certain size (for example, approximately 200 nm or more), there are often cases where the whiteness of the image to be recorded feels insufficient. Therefore, it is necessary to increase the size of the particle diameter of the white coloring material; however, there are problems in that, along with the increase in the particle diameter of the white coloring material, the particles settle in the ink composition. With respect to this problem, for example, JP-A-2007-211176 and Japanese Patent No. 4958001 describe using porous titanium dioxide particles as the white coloring material. It is disclosed that, by using such a porous white coloring material, it is possible to lower the specific gravity compared to the white coloring material using the titanium dioxide of the related art.

However, even in a case where the porous titanium dioxide particles described above are used as the white coloring material, it may not be said that the problem of sedimentation is sufficiently solved and there is still the same problem in that the white coloring material settles. In the same manner, since the specific gravity of the photoluminescent pigments described above is higher than the color pigments of the related art, there is a problem in that it is easy for settling to occur in the ink composition.

When the coloring material which is included in the ink settles, not only does the image quality of the image to be recorded decrease, but defects may occur such as the flow path of the apparatus (for example, an ink jet recording apparatus) for discharging the coloring material becoming clogged, or the discharge nozzles becoming clogged.

SUMMARY

An advantage of some aspects of the invention is to provide an ink set which includes an ink composition where settling of a coloring material is suppressed and a liquid droplet discharging apparatus having the same.

The invention can be realized in the following forms or application examples.

Application Example 1

According to an aspect of the invention, there is provided an ink set including a first ink composition which contains a first coloring material, and a second ink composition which contains a second coloring material other than the first coloring material, in which the first coloring material is at least one of a white coloring material formed of second particles with an average particle diameter of 200 nm or more to 1 μm or less formed by collecting a plurality of first particles with an average particle diameter of less than 200 nm, or a photoluminescent pigment with a specific gravity of 2.0 or more, and the viscosity of the first ink composition at 20° C. is 1.3 times or more with respect to the viscosity of the second ink composition at 20° C.

According to the ink set of Application Example 1, since it is possible to suppress the settling of the coloring material, the discharge stability of the ink is favorable in a case of application to a liquid droplet discharging apparatus.

Application Example 2

In Application Example 1, it is possible for the viscosity of the first ink composition at 20° C. to be 3 times or less with respect to the viscosity of the second ink composition at 20° C.

Application Example 3

In Application Example 1 or Application Example 2, it is possible for the density of the first ink composition to be 1.1 times or more with respect to the density of the second ink composition.

Application Example 4

In any one of Application Example 1 to Application Example 3, it is possible for the first particles to be formed of a metal oxide.

Application Example 5

An aspect of the liquid droplet discharging apparatus according to the invention is a liquid droplet discharging apparatus which has the ink set according to any one of Application Example 1 to Application Example 4.

Application Example 6

In Application Example 5, the liquid droplet discharging apparatus has a first nozzle which discharges the first ink composition, a first ink supply path which circulates the first ink composition, a first pump unit which supplies the first ink composition to the first nozzle via the first ink supply path, a second nozzle which discharges the second ink composition, a second ink supply path which circulates the second ink composition, and a second pump unit which supplies the second ink composition to the second nozzle via the second ink supply path, in which the surface area of a cross-section of the first ink supply path may be larger than the surface area of a cross-section of the second ink supply path.

Application Example 7

In Application Example 5 or Application Example 6, the liquid droplet discharging apparatus has a first nozzle which discharges the first ink composition, a first ink supply path which circulates the first ink composition, a first pump unit which supplies the first ink composition to the first nozzle via the first ink supply path, a second nozzle which discharges the second ink composition, a second ink supply path which circulates the second ink composition, and a second pump unit which supplies the second ink composition to the second nozzle via the second ink supply path, in which pressurization of the first pump unit may be greater than the pressurization of the second pump unit.

Application Example 8

In any one of Application Example 5 to Application Example 7, the liquid droplet discharging apparatus has a first nozzle which discharges the first ink composition, and a second nozzle which discharges the second ink composition, in which the discharge output of the first nozzle which discharges the first ink composition may be larger than the discharge output of the second nozzle which discharges the second ink composition.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
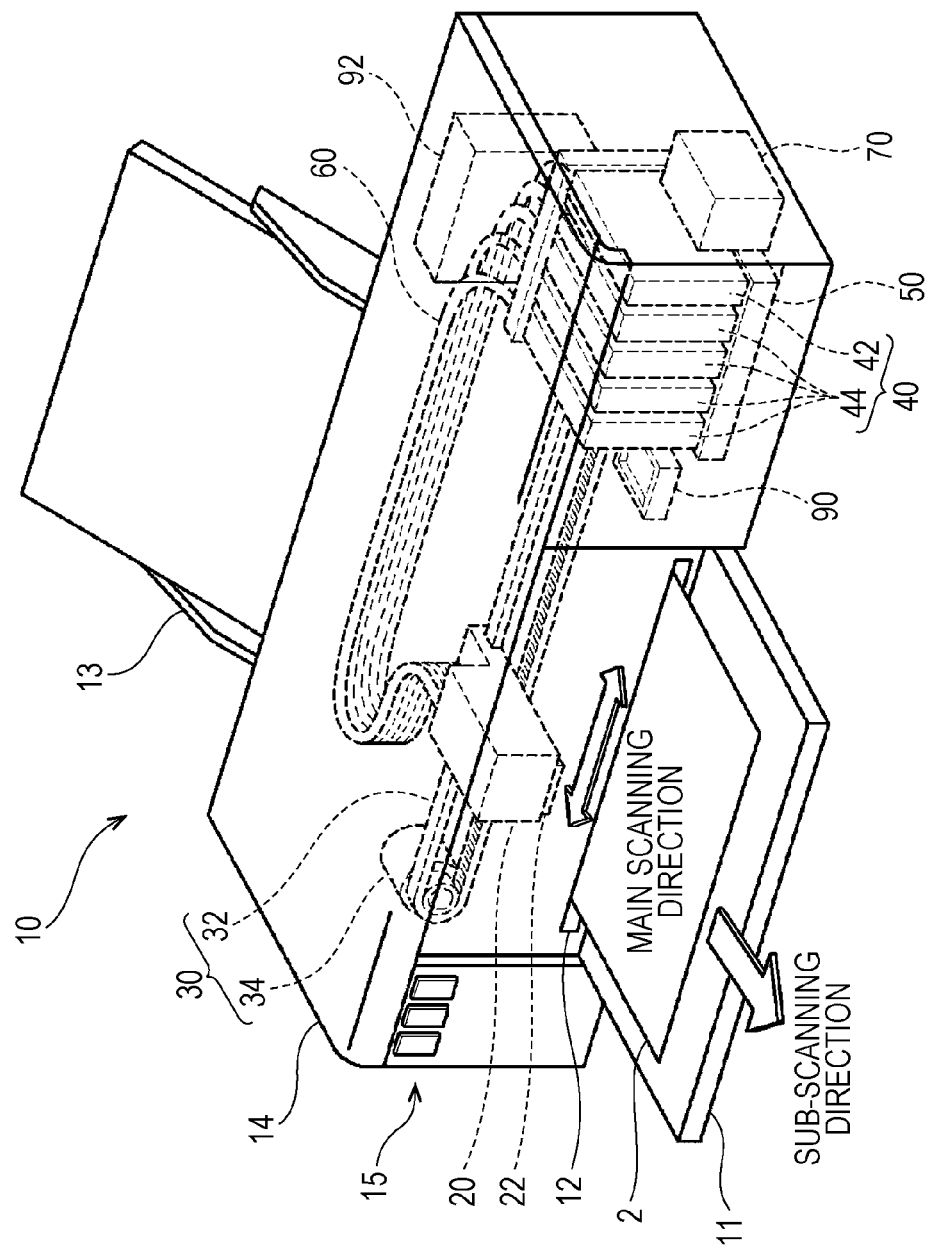
FIG. 1 is a diagram schematically illustrating an ink jet printer according to an embodiment of the invention.

Description will be given below of favorable embodiments of the invention. The embodiments described below illustrate an example of the invention. In addition, the invention is not limited to the following embodiments and also includes various types of modification examples carried out in a range not departing the gist of the invention.

1. Ink Set

An ink set according to an embodiment of the invention includes a first ink composition which contains a first coloring material and a second ink composition which contains a second coloring material other than the first coloring material, in which the first coloring material is at least one of a white coloring material formed of second particles with an average particle diameter of 200 nm or more to 1 μm or less formed by collecting a plurality of first particles with an average particle diameter of less than 200 nm, or a photoluminescent pigment with a specific gravity of 2.0 or more, and the viscosity of the first ink composition at 20° C. is 1.3 times or more the viscosity of the second ink composition at 20° C.

The ink set according to the present embodiment may be a set which includes one or more of each of the first ink composition and the second ink composition. Specific examples of the ink set according to the present embodiment are not limited to this; however, examples include combinations of an ink composition (the first ink composition) formed of at least one of a white ink composition and a photoluminescent ink composition described below and one or more color inks (the second ink composition) which are selected from cyan ink compositions, magenta ink compositions, yellow ink compositions, and black ink compositions.

In a case where an image is formed on a recording medium using the ink set according to the present embodiment, an image formed of the first ink composition and an image formed of the second ink composition may each be formed independently, or an image may be formed by bringing the first ink composition and the second ink composition into contact on the recording medium. In particular, the first ink composition is often used in order to form an image used as a background for an image formed of the second ink composition.

The white ink composition is an ink which is able to record a color commonly referred to as "white" and includes whites with traces of added colors. In addition, the ink which contains this pigment is referred to by names such as "whitish ink or white ink" and includes commercially available inks. Furthermore, for example, in a case where the ink has 100% duty or more on Epson pure photographic paper "Gloss" (manufactured by Seiko Epson Corp.) and is recorded in an amount where the surface of the photographic paper is sufficiently coated, when the brightness (L*) and the chromaticity (a*, b*) of the ink are measured using a spectrophotometer Spectrolino (trade name, manufactured by GretagMacbeth Co., Ltd.) by setting the measurement conditions to a D50 light source, an observation field of 2°, the density to DIN NB, the white reference to Abs, the filter to No, and the measurement mode to Reflectance, the inks include inks exhibiting the ranges of $70 \leq L^* \leq 100$, $-4.5 \leq a^* \leq 2$, and $-6 \leq b^* \leq 2.5$.

In the definition of the white inks described above, the "duty" is a value which is calculated using the following formula.

$$\text{Duty (\%)} = \text{actual discharge dot number}/(\text{vertical resolution} \times \text{horizontal resolution}) \times 100$$

(In the formula, "actual discharge dot number" is the number of dots which are actually discharged per unit of area, and the "vertical resolution" and the "horizontal resolution" are each resolutions per unit length)

When the photoluminescent ink composition is attached to the medium, the ink exhibits photoluminescence. In addition, the photoluminescence indicates a property which is characterized by the specular gloss (refer to Japanese Industrial Standard (JIS) Z8741) of the obtained image. For example, as the types of photoluminescence, there are photoluminescence such as where light undergoes specular reflection, so-called matte photoluminescence, and the like, and it is possible for each to be characterized according to the level of the specular gloss.

Below, the components which are included in the first ink composition and the second ink composition which configure the ink set according to the present embodiment and the components which are able to be included will be described for each of the ink compositions.

1.1. First Ink Composition 1.1.1. First Coloring Material

The first ink composition contains the first coloring material. Examples of the first coloring material include at least one of the white coloring material and the photoluminescent pigment provided with the characteristics described below.

The content of the first coloring material (in terms of solid content) is preferably 1 mass % or more to 20 mass % or less with respect to the total weight of the first ink composition, more preferably 5 mass % or more to 15 mass % or less. By setting the content of the first ink coloring material to within the ranges described above, it is easy to obtain a first ink composition with excellent dispersibility and it is easy to obtain an image with excellent coloring properties.

White Coloring Material

The white coloring material is formed of second particles formed by collecting a plurality of first particles with an average particle diameter of less than 200 nm and the average particle diameter of the second particles is 200 nm or more to 1 μm or less. In this manner, since the second particles are formed by collecting a plurality of the minute first particles, numerous holes (voids) are formed on the surface of the second particles. Due to this, since it is possible for a dispersion medium to penetrate the voids of the second particles, the dispersibility of the second particles (white coloring material) in the first ink composition is favorable. Furthermore, since the second particles have a specific weight which is lower in comparison with a white coloring material which has the same particle diameter and where numerous holes are not formed on the surface, the second particles are less likely to settle in the ink.

In the ink set according to the invention, the viscosity of the first ink composition as described below is higher than that of the second ink composition. Therefore, in a case where the white coloring material described above is used as the first coloring material, since the effect of improving the sedimentation of the white coloring material and the effect of improving the sedimentation due to the viscosity of the ink composition act in synergy, the effect of improving the sedimentation of the first coloring material is further increased.

It is necessary for the average particle diameter of the first particles to be less than 200 nm; however, 50 nm or more to less than 200 nm is preferable, 60 nm or more to 150 nm or less is more preferable, and 70 nm or more to 110 nm or less is particularly preferable. By setting the average particle diameter of the first particles to less than 200 nm, even in a case where the first particles which do not configure the second particles are present in the ink, it is possible to suppress sedimentation of the first particles. In addition, when the particle diameter of the first particles is 50 nm or more, in a case where the first particles which do not configure the second particles are present in the ink, the effect of the first particles is less compared to the second particles; however, the first particles contribute to the improvement of the whiteness of the image. On the other hand, when the average particle diameter of the first particles is 200 nm or more, the particle diameter of the second particles formed using such particles is excessively large and there are cases where sedimentation in the ink, discharge defects, and the like occur.

It is possible to measure the average particle diameter of the first particles using a scanning electron microscope (SEM). In detail, the average particle diameter of the first particles refers to the arithmetic average values of the values which are obtained by individually measuring the diameters of 10 of the first particles selected from an image obtained by the scanning electron microscope.

The first particles preferably include at least one type of compound selected from metal oxides (for example, titanium dioxide, zinc oxide, silica, alumina, magnesium oxide, zirconium dioxide, yttria stabilized zirconium, indium oxide, antimony oxide, tin oxide, barium titanate, or the like), barium sulfate, and calcium carbonate. These compounds may be used as one type alone, or may be used in a combination of two or more types. Among these compounds, from the point of view of the whiteness, the shielding property, and the physical strength, it is more preferable to use metal oxide, and titanium dioxide and zirconium dioxide are even more preferable. Here, the first particles may have a so-called core-shell structure where one type or more of the compounds is coated with one type or more of the compounds.

The first particles are prepared using a well-known preparing method, in detail, examples of the preparing method include grinding methods, synthesis methods (for example, evaporation-condensation methods, gas-phase reaction methods, colloid methods, homogeneous precipitation methods, hydrothermal synthesis methods, microemulsion methods, and the like), or the like.

Commercially available products may be used in the first particles and examples thereof include TTO-51 (A), TTO-51 (C), TTO-55 (A), TTO-55 (B), TTO-55 (C), and TTO-55 (D) manufactured by Ishihara Sangyo Co., Ltd., MT-700B, JR-301, JR-403, JR-405, JR-600A, JR-605, JR-600E, JR-603, JR-805, JR-806, JR-701, JRNC, JR-800, JR, JA-1, JA-C, and JA-3 manufactured by Tayca Corp. (the above are all trade names) or the like.

In addition, the first particles may be subjected to a surface treatment using a silane coupling agent (for example, γ-glycidoxypropyltrimethoxysilane, or the like), polymers such as polyvinylpyrrolidone and polyvinyl alcohol, or a surface treatment agent such as organic acid. Due to this, since a group derived from a surface treatment agent is introduced onto the surface of the first particles, it is possible to improve the dispersibility of the first particles in the medium.

It is necessary for the average particle diameter of the second particles (the white coloring material) to be 200 nm or more to 1 μm or less; however, 250 nm or more to 800 nm or less is preferable, 270 nm or more to 600 nm or less is more preferable, and 300 nm or more to 500 nm or less is particularly preferable. By setting the average particle diameter of the second particles to 200 nm or more, the whiteness of the recorded image is favorable. In addition, by setting the average particle diameter of the second particles to 1 μm or less, it is possible to suppress the sedimentation of the second particles and the discharge stability is favorable when applied to the liquid droplet discharging apparatus. On the other hand, when the average particle diameter of the second particles is less than 200 nm, there is a tendency for the whiteness of the recorded image to be insufficient, and when the average particle diameter of the second particles exceeds 1 μm, it is easy for the second particles to settle and discharge defects occur.

The average particle diameter of the second particles refers to the volume average particle diameter which is calculated from the particle size distribution after calculating the particle size distribution on a volume basis by detecting a light intensity distribution pattern of diffracted scattered light using a laser diffraction particle size distribution measuring apparatus and calculating the light intensity distribution pattern thereof based on Mie scattering theory. Examples of the laser diffraction particle size distribution measuring apparatus include a Micro track UPA (manufactured by Nikkiso Co., Ltd.).

The second particles (the white coloring material) include the first particles described above and may further include organic polymer particles. When using the organic polymer particles, it is easy to collect a plurality of the first particles and make one particle (the second particles). It is preferable to use particles which are able to be dispersed in an aqueous medium as the organic polymer particles and examples thereof include water-insoluble organic polymer particles obtained by setting at least one type selected from polyolefin, poly(meth)acrylic acid, polystyrene, polyurethane, polyacrylonitrile, polyvinyl chloride, polyvinylidene chloride, polyvinyl acetate, polybutadiene, and the like as a raw material.

The average particle diameter of the organic polymer particles is preferably 10 nm or more to 300 nm or less, and even more preferably 10 nm or more to 200 nm or less. In a case where the second particles include organic polymer particles, it is possible to set the ratio of the organic polymer particles to the first particles in the second particles to a mass ratio of 10:90 to 90:10. The average particle diameter of the organic polymer particles refers to the volume average particle diameter calculated from the particle size distribution measured using the same method and measurement apparatuses for the second particle diameter.

The second particles are porous particles which have a plurality of holes of the surfaces thereof. The average pore diameter of the holes of the second particles is preferably 10 nm or more to 300 nm or less and more preferably 10 nm or more to 200 nm or less. The average pore diameter in the invention indicates the average pore diameter calculated from the total pore volume and the specific surface area. Here, it is possible for the total pore volume and the specific surface area to be calculated based on the pore distribution obtained using an adsorption method (using nitrogen gas), in detail, it is possible to calculate the total pore volume using the BJH method and the specific surface area using the BET method. Examples of an apparatus capable of carrying out the gas adsorption method include the Autosorb 3 (product name) manufactured by Quantachrome Corp., and the like.

Although the porosity of the second particles is not particularly limited, it is possible for the porosity to be, for example, 20% or more to 90% or less, or to be 30% or more to 85% or less. The porosity is calculated based on the total pore volume described above.

Here, in a case where the second particles (the white coloring material) are used as the first coloring material, the first ink composition may include first particles fallen off from the second particles.

Method for Preparing White Coloring Material (Second Particles)

The method for preparing the white coloring material (the second particles) described above is not particularly limited; however, it is possible to carry out preparing by, for example, executing the following the steps (i) to (iii). In the following steps, description will be given of an example of a case where metal oxide is used as the first particles.

Step (i) is a step of preparing a mixed solution in which an aqueous dispersion of the organic polymer particles described above is mixed or reacted with the aqueous dispersion of the first particles described above.

The aqueous dispersion of the first particles is obtained by adding the first particles to the aqueous medium and stirring. Since the first particles improve the aqueous dispersibility in the aqueous medium, the first particles may be added to the aqueous medium by using a medium where the surface treatment agent described above is introduced, or may be added to the aqueous medium which includes the surface treatment agent described above. The aqueous dispersion of the organic polymer particles is obtained by adding the organic polymer particles to an aqueous medium and stirring. By mixing and stirring each of the aqueous dispersions obtained in this manner, mixed solutions which contain the first particles and the organic polymer particles are obtained.

As the aqueous medium, it is possible to use at least one of water and a polar organic solvent. The polar organic solvent is not particularly limited; however, examples thereof include methanol, ethanol, propyl alcohol, isopropyl alcohol, acetonitrile, dimethyl sulfoxide, dimethyl formamide, acetone, tetrahydrofuran, dioxane, and the like.

Here, step (i) may adopt a method for preparing a reaction solution using a sol-gel reaction using a metal oxide precursor in the presence of organic polymer particles instead of the method described above. In detail, the reaction solution is obtained by mixing the organic polymer particles, the metal oxide precursor, the aqueous medium, the sol-gel reaction catalyst, and the like according to an arbitrary ratio and reaction conditions. As the metal oxide precursor, it is possible to use alkoxides or the like of the metal configuring the metal oxide described above (for example, titanium tetraisopropoxide, or the like). In addition, as the sol-gel reaction catalyst, it is possible to use, for example, an acid catalyst (such as inorganic and organic acids) and alkali catalysts (such as alkali metal hydroxide, or amines).

Step (ii) is a step of drying a mixed solution obtained using step (i) described above. Due to this, an organic-inorganic complex which includes the first particles and the organic polymer particles is obtained.

It is possible for the organic-inorganic complex to be manufactured by crushing or the like of a solid obtained by heating and drying a mixed solution, crushing a solid obtained by heating and drying a mixed solution after freezing and drying, or spraying and drying a mixed solution.

In a case where the mixed solution is heated and dried, the heating and drying are preferably performed under conditions of 20° C. or more to 300° C. or less, more preferably under conditions of 80° C. or more to 200° C. or less. Due to this, it is easy to disperse and arrange the organic polymer particles in a matrix configured by a plurality of the first particles.

In addition, by classifying the obtained organic-inorganic complex using a well-known sieve apparatus or the like after the crushing is performed, it is easy to obtain an organic-inorganic complex which has a desired average particle diameter.

Step (iii) is a step of removing at least a part of the organic polymer particles which are present in the organic-inorganic complex obtained in step (ii) described above. Due to this, it is possible to obtain the second particles formed by collecting a plurality of the first particles. The obtained second particles are porous particles having substantially uniform holes on the surfaces thereof.

Example of the method for removing the organic polymer particles include methods for firing by heating, methods for irradiating plasma, far-infrared rays, microwaves, vacuum ultraviolet rays, and the like, methods for eluting and removing using a solvent, water, or the like, and the like. In a case where the organic polymer particles are removed by firing, the firing temperature is preferably set to 300° C. or more to 2000° C. or less, more preferably 400° C. or more to 1000° C. or less, and particularly preferably 500° C. or more to 800° C. or less. By setting the firing temperature to within the ranges described above, it is possible to appropriately remove the organic polymer particles which are present on the surface of the organic-inorganic complex. In addition, since it is possible to stabilize the crystallite size and to suppress the melting of the oxide particles, holes caused by the removal of the organic polymer particles are favorably formed.

Photoluminescent Pigment

As the photoluminescent pigment, a pigment where the specific gravity is 2.0 or more is used. Since the viscosity of the first ink composition is set to be higher than the second ink composition, it is possible to suppress the sedimentation of the first ink composition even when using a photoluminescent pigment with a high specific gravity. Due to this, it is possible to form an image which has excellent photoluminescence.

The photoluminescent pigment is not particularly limited as long as the photoluminescent pigment has a specific gravity of 2.0 or more and exhibits photoluminescence when attached to the medium; however, examples include alloys (also referred to as metal pigments) of one type or two types or more selected from a group consisting of aluminum (2.7), silver (10.5), gold (19.3), platinum (21.37), nickel (8.9), chromium (7.0), tin (7.3), zinc (7.14), indium (7.3), titanium (4.5), and copper (8.93). Here, the number in brackets is the specific gravity.

It is necessary for the specific gravity of the photoluminescent pigment to be 2.0 or more; however, 2.0 or more to 22 or less is preferable, and 2.0 or more to 5.0 or less is more preferable. By using a photoluminescent pigment with a specific gravity of 5.0 or less, it is possible to further suppress the sedimentation of the photoluminescent pigment.

The photoluminescent pigment may be subjected to a surface treatment for suppressing a reaction with water. As the photoluminescent pigment subjected to the surface treatment, description will be given of an example of a case where an aluminum pigment is used.

Examples of the aluminum pigment include pigments having a planar shape. The planar shape is, for example, a shape such as a scale-like shape, a leaf-like shape, a plate-like shape, a film-like shape or the like. The aluminum pigment may be coated with an inorganic oxide or the like. Due to the coating, there are cases where it is possible to suppress the generation of bubbles in the ink. When the aluminum pigment has a planar shape, it is easy to obtain a favorable metal luster when the ink is attached to the recording medium.

A 50% average particle diameter R50 (referred to below simply as "R50") of the equivalent circle diameter of the aluminum pigment coated by the coating film, determined from the surface area of a projected image of the particles obtained by a particle image analyzer is preferably 0.25 μm or more or 3 μm or less, more preferably 0.5 μm or more to 2 μm or less, and even more preferably 0.7 μm or more to 1.8 μm or less. When the average particle diameter R50 is within the ranges described above, it is possible to suppress the sedimentation of the aluminum while holding the metal luster of the recorded image.

Examples of the particle image analyzer for measuring the surface area and the circle equivalent diameter of the projected image of the aluminum pigment particles include flow-type particle image analyzers FPIA-2100, FPIA-3000, and FPIA-3000S (the above are manufactured by Sysmex Co., Ltd.). Here, the average particle diameter of the circle equivalent diameter is the particle diameter on a number basis. In addition, examples of a measuring method example in a case of using FPIA-3000 and FPIA-3000S include carrying out measuring using a high magnification imaging unit in a HPF measuring mode.

In the present embodiment, the maximum value of the equivalent circle diameter of the aluminum pigment particles is preferably 3 μm or less. As long as the equivalent circle diameter of the largest particles is 3 μm or less, it is possible to suppress clogging in the nozzle opening section or the ink flow path when using the ink jet recording apparatus.

In addition, the thickness of the aluminum pigment particles is 5 nm or more to 100 nm or less, preferably 5 nm or more to 70 nm or less, and more preferably 10 nm or more to 50 nm or less.

Here, the thickness is measured using a transmission electron microscope or a scanning electron microscope and examples thereof include transmission electron microscopes (TEM: JEOL, JEM-2000EX), field emission scanning electron microscopes (FE-SEM: Hitachi, S-4700), and the like. Here, the thickness has the meaning of the average thickness and the measuring is performed 10 times to obtain the average value.

As the material of the coating film in the case of the aluminum pigment having a coating film, a material including, for example, alkoxysilane (for example, tetraethoxysilane (TEOS)), polysilazane, or compounds derived from these compounds, fluorine-based material, phosphorus-based material, or phosphate-based material is preferable. The method for creating the coating film is not particularly limited; however, for example, it is possible to use the description in the specification of U.S. Patent Application Publication No. 2010/0256284, U.S. Patent Application Publication No. 2010/0256283, or the like.

In addition, the aluminum pigment may be supplied in the form of a dispersion. Examples of the components which are included in the dispersion of the aluminum pigment include water, organic solvents, basic catalysts, surfactants, tertiary amines, buffers, and the like, which may be blended as appropriate.

1.1.2. Solvent

It is possible for the first ink composition to contain at least one of water and an organic solvent (which will be described below) as a solvent. In a case where the first ink composition contains water as the solvent, the first ink composition may be used as a so-called aqueous ink. On the other hand, in a case where the first ink composition substantially does not contain water, the first ink composition may be used as a so-called non-aqueous ink.

In the invention, "A is substantially not included" has the meaning that A is not intentionally added when preparing the ink, or has the meaning that A is not added in excess of an amount which sufficiently fits the definition of A being added. As specific examples of "substantially not included", for example, there are 1.0 mass % or more is not included, preferably 0.5 mass % or more is not included, more preferably 0.1 mass % or more is not included, even more preferably 0.05 mass % or more is not included, particularly preferably 0.01 mass % or more is not included, and yet more preferably 0.001 mass % or more is not included.

In a case where water is contained, it is preferable to use water where ionic impurities are removed as much as possible, such as pure water such as ion-exchanged water, ultra filtered water, reverse osmosis water, and distilled water, as well as ultrapure water. In addition, when water which is sterilized by ultraviolet radiation or the addition of hydrogen peroxide is used, it is possible to prevent the growth of mold or bacteria in a case where the pigment dispersion and the ink using the same are stored for a long time.

In a case where the first ink composition is an aqueous ink, for example, it is possible to set the content of the water to 50 mass % or more with respect to the total weight of the first ink composition.

1.1.3. Organic Solvent

The first ink composition may contain an organic solvent. The first ink composition may contain a plurality of types of organic solvents. The organic solvent is not particularly limited; however, examples thereof include 1,2-alkane diols, polyhydric alcohols, pyrrolidone derivatives, lactone, glycol ethers, and the like.

Examples of the 1,2-alkane diols include 1,2-propanediol, 1,2-butanediol, 1,2-pentanediol, 1,2-hexanediol, 1,2-octane diol, or the like. Since the 1,2-alkane diols has an excellent uniform wetting action by increasing the wettability of the ink with respect to the recording medium, there are cases where it is possible to form an image with excellent adhesion on the recording medium. In a case where the 1,2-alkane diols are contained, it is possible to set the content thereof to 1 mass % or more to 20 mass % or less with respect to the total weight of the first ink composition.

Examples of the polyhydric alcohols include ethylene glycol, diethylene glycol, propylene glycol, dipropylene glycol, 1,3-propanediol, 1,4-butanediol, 1,6-hexane diol, trimethylol propane, glycerin, and the like. It is possible to preferably use polyhydric alcohols from the point of view of being able to reduce clogging, discharge defects, and the like by suppressing drying of the ink on a nozzle surface of a recording head of the ink jet recording apparatus. In a case where polyhydric alcohols are contained, it is possible to contain 2 mass % or more to 20 mass % or less thereof with respect to the total weight of the first ink composition.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. It is possible for the pyrrolidone derivatives to act as a good solubilizer of the resin component. In a case where a pyrrolidone derivative is contained, it is possible to set the content thereof to 0.5 mass % or more to 10 mass % or less with respect to the total weight of the first ink composition.

In the invention, "lactone" refers to a generic term for cyclic compounds having an ester group (—CO—O—) in the ring. The lactones are not particularly limited as long as the lactones are included in the above definition; however, it is preferable that the lactones have a carbon number of 2 or more to 9 or less. Specific examples of the lactones include α-ethyl lactone, α-aceto lactone, β-propiolactone, γ-butyrolactone, δ-valerolactone, ε-caprolactone, ζ-henin thiolactone, η-capri butyrolactone, γ-valerolactone, γ-heptalactone, γ-nonalactone, β-methyl-δ-valerolactone, 2-butyl-2-ethyl propiolactone, α,α-diethylpropiolactone, and the like; however, among these, γ-butrolactone is particularly preferable. Regarding the lactones, in a case where the recording medium is a vinyl chloride resin film or the like, the ink permeates to the inside of the recording medium and it is possible to increase the adhesion. In particular, the lactones are preferably used in a case where the first ink composition is a non-aqueous ink and it is possible to set the content in such a case to 5 mass % or more to 30 mass % or less with respect to the total weight of the first ink composition.

Examples of the glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol mono isohexyl ether, ethylene glycol mono isoheptyl ether, diethylene glycol mono isoheptyl ether, triethylene glycol mono isoheptyl ether, ethylene glycol monooctyl ether, ethylene glycol mono isooctyl ether, diethylene glycol mono isooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methyl pentyl ether, diethylene glycol mono-2-methyl pentyl ether, propylene glycol mono butyl ether, dipropylene glycol monobutyl ether, tripropylene glycol monobutyl ether, propylene glycol monopropyl ether, dipropylene glycol monopropyl ether, and tripropylene glycol monomethyl ether. It is possible to use these as one type alone or in a mixture of two types or more. The glycol ethers make it possible to control the wettability and the permeation speed of the ink with respect to the recording medium. Therefore, it is possible to record a clear image with little shading unevenness. In a case where the first ink composition is used as the aqueous ink, when the glycol ethers are contained, it is possible for the content thereof to be set to 0.05 mass % or more to 6 mass % or less with respect to the total weight of the first ink composition. On the other hand, in a case where the first ink composition is used as a non-aqueous ink, it is possible to set the content thereof to 70 mass % or more to 90 mass % or less with respect to the total weight of the first ink composition.

1.1.4. Surfactant

The first ink composition may contain a surfactant. The surfactant is provided with functions of decreasing the surface tension and improving the wettability with the recording medium. Among surfactants, for example, it is possible to preferably use an acetylene glycol-based surfactant, a silicone-based surfactant, or a fluorine-based surfactant.

The acetylene glycol surfactant is not particularly limited; however, examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D, (the above are all trade names, manufactured by Air Products and Chemicals. Inc.), Olfine B, Y, P, A, STG, SPC, E 1004, E 1010, PD-001, PD-002 W, PD-003, PD-004, EXP. 4001, EXP. 4036, EXP. 4051, AF-103, AF-104, AK-02, SK-14, and AE-3 (the above are all trade names, manufactured by Nissin Chemical Industry Co., Ltd.), Acetylenol E00, E00P, E40, and E100, (the above are all trade names, manufactured by Kawaken Fine Chemicals Co., Ltd.).

The silicone surfactant is not particularly limited; however, preferable examples include polysiloxane-based compound. The polysiloxane-based compound is not particularly limited; however, examples include polyether-modified organosiloxane. Commercially available products of the polyether-modified organosiloxane include BYK-306, BYK-307, BYK-333, BYK-341, BYK-345, BYK-346, BYK-348 (the above are all trade names, manufactured by BYK Co., Ltd.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are all trade names, manufactured by Shin-Etsu Chemical Co., Ltd.).

As the fluorine-based surfactant, a fluorine-modified polymer is preferably used and specific examples thereof include BYK-340 (manufactured by BYK-Chemie Japan KK).

In a case where a surfactant is contained, the content thereof is preferably 0.1 mass % or more to 1.5 mass % or less with respect to the total weight of the first ink composition.

1.1.5. Other Components

The first ink composition may contain a resin, a thickener, a pH adjusting agent, antiseptic and antifungal agents, a rust inhibitor, a chelating agent, and the like as necessary.

Resin

It is possible for the resin to improve the physical strength such as the scratch resistance of the image to be recorded. Examples of the resin include known resins such as acrylic resin, styrene-acrylic resin, fluorene resin, urethane resin, polyolefin resin, rosin-modified resin, terpene resin, polyester resin, polyamide resin, epoxy resin, vinyl chloride resin, vinyl chloride-vinyl acetate copolymers, ethylene vinyl acetate resins, and the like, or polyolefin wax and the like. It is possible for these resins to be used alone as one type or in a combination of two types or more.

Among the resins exemplified above, it is possible to preferably use styrene-acrylic resin, polyester resin, and polyolefin wax.

It is possible to use a commercial product as the polyester resin and examples thereof include Eastek 1100, 1300, and 1400 (the above are all trade names, manufactured by Eastman Chemical Japan Co., Ltd.), Elitel KA-5034, KA-3556, KA-1449, KT-8803, KA-5071S, KZA-1449S, KT-8701, and KT9204, (the above are all trade names, manufactured by Unitika Co., Ltd.), and the like.

Examples of the styrene-acrylic resin include styrene-acrylic acid copolymers, styrene-methacrylic acid copolymers, styrene-methacrylic acid-acrylic acid ester copolymers, styrene-α-methyl styrene-acrylic acid copolymer, styrene-α-methyl styrene-acrylic acid acrylic acid ester copolymer, and the like. Here, as the form of the copolymer, it is possible to use any form of a random copolymer, a block copolymer, an alternating copolymer, or a graft copolymer. Here, as the styrene-acrylic resin, commercially available styrene-acrylic resins may be used. Examples of commercially available styrene-acrylic resins include Joncryl 62J (manufactured by BASF Japan Co., Ltd.).

The polyolefin wax is not particularly limited and examples thereof include waxes and copolymers thereof manufactured from olefins such as ethylene, propylene, butylene or derivatives thereof, in detail, polyethylene wax, polypropylene wax, polybutylene-based wax, and the like. Among these, from the point of view that it is possible to reduce the generation of cracking in the image, polyethylene wax is preferable. It is possible for the polyolefin wax to be used as one type alone or in a combination of two types or more.

Examples of commercially available polyolefin wax include the Chemipearl series such as "Chemipearl W4005" (manufactured by Mitsui Chemicals, Inc., polyethylene wax, particle size 200 to 800 nm, ring and ball softening point 110° C., penetration method hardness 3, and solid content 40%). Other examples include the AQUACER series such as AQUACER 513 (polyethylene wax, particle size 100 to 200 nm, melting point 130° C., and solid content 30%), AQUACER 507, AQUACER 515, AQUACER 840 (the above are all trade names, manufactured by BYK Japan Co., Ltd.), the High Tech series such as High Tech E-7025P, High Tech E-2213, High Tech E-9460, High Tech E-9015, High Tech E-4A, High Tech E-5403P, and High Tech E-8237 (the above are all trade names, manufactured by Toho Chemical Industry Co., Ltd.), Nopcoat PEM-17 (manufactured by San Nopco Ltd., polyethylene emulsion, particle size 40 nm), and the like. These are commercially available in the form of an aqueous emulsion where polyolefin wax is dispersed in water in a normal manner.

In a case where a resin is contained, the content thereof (in terms of solid content) is preferably 1 mass % or more to 10 mass % or less with respect to the total weight of the first ink composition, and more preferably 1 mass % or more to 7 mass % or less.

Thickener

A thickener is used in order to adjust the viscosity of the ink. Examples of the thickeners include polyvinyl alcohols, poly(meth)acrylic acids, polyethers, polyvinylpyrrolidones, polyvinyl formals, proteins (for example, gelatin, casein, glue, or the like), polysaccharides (for example, pullulan, dextran, dextrin, cyclodextrin, carrageenan, pectin, glucomannan, sodium alginate, xanthan gum, gum arabic, locust bean gum, tragacanth, guar gum, tamarind gum, or the like), starches (for example, starch, oxidized starch, carboxyl starch, dialdehyde starch, or the like), cellulose and derivatives thereof (for example, methylcellulose, ethyl cellulose, carboxymethyl cellulose, hydroxyethyl cellulose, hydroxypropyl cellulose, hydroxypropyl methyl cellulose, or the like), alginate (for example, sodium alginate, potassium alginate, ammonium alginate, or the like), and alginic acid esters (for example, alginic acid propylene glycol esters, or the like).

In a case where a thickener is contained, it is possible to appropriately set the content thereof according to the viscosity of the first ink composition; however, for example, it is possible to set the content to 1 mass % or more to 10 mass % or less with respect to the total weight of the first ink composition.

pH Adjusting Agent

Examples of pH adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate, and the like.

Antiseptic and Antifungal Agent

Examples of the antiseptic and antifungal agents include sodium benzoate, pentachlorophenol sodium, 2-pyridinethiol-1-oxide sodium, sodium sorbate, dehydro sodium acetate, 1,2-dibenzothiazolin-3-one, and the like. Examples of the commercially available products include Proxel XL2, and Proxel GXL (the above are all trade names, manufactured by Avecia Ltd.), and Denicide CSA, and NS-500 W (the above are all trade names, manufactured by Nagase Chemtex Co., Ltd.).

Rust Inhibitor

Examples of the rust inhibitors include benzotriazole and the like.

Chelating Agents

Examples of the chelating agents include ethylenediaminetetraacetic acid and salts thereof (ethylenediamine tetraacetate dihydrogen disodium salt, or the like) and the like.

1.2. Second Ink Composition

It is possible for the second ink composition to be so-called color inks exhibiting the colors of black, cyan, magenta, yellow, black, and the like when attached to a recording medium. Below, description will be given of components which are included in the second ink composition or which may be included therein.

1.2.1. Second Coloring Material

The second ink composition contains the second coloring material. In the invention, the "second coloring material" refers to a coloring material other than the first coloring material described above and examples thereof include dyes, pigments, and the like.

As the dyes and pigments, it is possible to favorably use those described in U.S. Patent Application Publication No. 2010/0086690, U.S. Patent Application Publication No. 2005/0235870, and International Publication No. 2011/027842. Out of the dyes and pigments, it is more preferable to include a pigment. The pigments are preferably organic pigments from the point of view of storage stability such as light resistance, weather resistance, and gas resistance.

In detail, as the pigments, azo pigments such as insoluble azo pigments, condensed azo pigments, azo lake, and chelate azo pigments; polycyclic pigments such as phthalocyanine pigment, perylene and perynone pigments, anthraquinone pigment, quinacridone pigments, dioxane pigments, thioindigo pigment, isoindoline pigment, and quinophthalone pigments; dye chelates, color lakes, nitro pigments, nitroso pigments, aniline black, daylight fluorescent pigments, carbon black, and the like may be used. It is possible for the pigments described above to be used as one type alone or in a combination of two types or more.

In addition, as the dyes, it is possible to use various types of dyes used in normal ink jet recording, such as direct dyes, acid dyes, food dyes, basic dyes, reactive dyes, disperse dyes, vat dyes, soluble vat dyes, and reactive disperse dyes.

The content of the second coloring material is preferably 1 mass % or more to 20 mass % or less with respect to the total weight of the second ink composition, more preferably 1 mass % or more to 15 mass % or less.

1.2.2. Solvent

It is possible for the second ink composition to contain at least one of water and an organic solvent as a solvent. In a case where the second ink composition contains water as a solvent, a so-called aqueous ink may be used. On the other hand, in a case where the first ink composition substantially does not contain water, the first ink composition may be used as a so-called non-aqueous ink.

In a case where water is contained, it is preferable to use water where ionic impurities are removed as much as possible, such as pure water such as ion-exchanged water, ultra filtered water, reverse osmosis water, and distilled water, as well as ultrapure water. In addition, when water which is sterilized by ultraviolet radiation or the addition of hydrogen peroxide is used, it is possible to prevent the growth of mold or bacteria in a case where the pigment dispersion and the ink using the same are stored for a long time.

In a case where the second ink composition is an aqueous ink, for example, it is possible to set the content of the water to 50 mass % or more with respect to the total weight of the second ink composition.

1.2.3. Other Components

The second ink composition may contain an organic solvent, a surfactant, a resin, a thickener, a pH adjusting agent, antiseptic and antifungal agents, a rust inhibitor, a chelating agent, and the like as necessary. Since specific examples of these components and the ranges of the added amounts when these are contained are the same as given for the first ink composition, description thereof will be omitted.

1.3. Ink Preparation Method

It is possible to obtain the first ink composition and the second ink composition according to the present embodiment by respectively mixing the components (materials) described above in an arbitrary order, performing filtering as necessary, and removing impurities. Here, in a case where a pigment is added, it is preferable that the pigment be mixed in after being prepared in a state of being uniformly dispersed in a solvent in advance since the handling is simplified.

As the method for mixing each of the materials, it is possible to favorably use a method for stirring and mixing after adding materials sequentially to a container provided with a stirring apparatus such as a mechanical stirrer or a magnetic stirrer. As a filtration method, for example, it is possible to perform centrifugal filtration, filter filtration, or the like as necessary.

1.4. Physical Properties of Ink 1.4.1. Viscosity

Since the first coloring material which is included in the first ink composition increases the coloring properties (whiteness and photoluminescence), the particle density and the specific gravity are large in comparison with the second coloring material (the pigments or the like used in normal color inks). Therefore, in a case where the first coloring material which is included in the first ink composition is added into the solvent in the same manner as a normal ink (the second ink composition), there is a problem in that it is easy for sedimentation to occur. With respect to this problem, by setting the viscosity of the first ink composition and the viscosity of the second ink composition to the following relationship, it is possible to improve the sedimentation of the first coloring material which is included in the first ink composition.

In detail, it is necessary for the viscosity of the first ink composition to be 1.3 times or more with respect to the viscosity of the second ink composition; however, 1.5 times or more is preferable, 2.0 times or more to 20 times or less is more preferable, and 3.0 times or more to 10 times or less is even more preferable. When the viscosity is 1.3 times or more, the first coloring material which is included in the first ink composition does not easily settle and when the viscosity is 20 times or less, it is possible to suppress a decrease in the circulation property in the ink supply path inside the ink jet recording apparatus and suppress a decrease in the discharging property of the discharge nozzles while improving the sedimentation. On the other hand, when the viscosity is less than 1.3 times, it is easy for the first coloring material which is included in the first ink composition to settle.

Furthermore, by the viscosity of the first ink composition and the viscosity of the second ink composition satisfying the relationship described above, an unexpected effect was found in that it is possible to reduce the bleeding of the second ink composition and a favorable image was obtained. That is, in a case where an image is recorded using the ink set according to the invention, recording is performed such that the first ink composition and the second ink composition come into contact on the recording medium. In such a case, since both inks are easily mixed when the viscosities of the first ink composition and the second ink composition are close, there is a tendency for images which are formed by the second ink to bleed easily. In contrast to this, in the ink set according to the invention, since the viscosities of the first ink composition and the second ink composition are sufficiently separated, the first ink composition and the second ink composition do not easily mix by coming into contact on the recording medium. Due to this, it is possible to reduce the bleeding of images which are formed using the second ink composition. In particular, when the viscosity of the first ink is 2.0 times or more with respect to the viscosity of the second ink composition, this effect is further exhibited.

The viscosity of the first ink composition at 20° C. is preferably 4.0 mPa·s or more, more preferably 5.0 mPa·s or more to 50 mPa·s or less, even more preferably 7.0 mPa·s or more to 30 mPa·s or less, and particularly preferably 8.0 mPa·s or more to 15 mPa·s or less. By the viscosity of the first ink composition being 5.0 mPa·s or more, it is more difficult for the first coloring material which is included in the first ink composition to settle. In addition, when the viscosity of the first ink composition is 50 mPa·s or less, it is possible to suppress a decrease in the circulation property in the ink supply path inside the ink jet recording apparatus and suppress a decrease in the discharging property of the discharge nozzles.

The viscosity of the second ink composition at 20° C. is preferably 2.5 mPa·s or more to 38.5 mPa·s or less, more preferably 3.0 mPa·s or more to 20 mPa·s or less, and particularly preferably 3.5 mPa·s or more to 10 mPa·s or less. By the viscosity of the second ink composition being 2.5 mPa·s or more, it is possible to favorably use the second ink composition in the ink jet recording apparatus since the ink is discharged in an appropriate amount from the discharge nozzle. In addition, by the viscosity of the second ink composition being 38.5 mPa·s or less, a favorable image is obtained since the aggregation of the second coloring material, the bleeding of the recorded image, and the like do not easily occur.

It is possible to measure the viscosities of each of the inks in the invention by using a vibration viscometer VM-100 AL (manufactured by Yamaichi Electronics Co., Ltd.) and maintaining the temperature of the ink at 20° C.

It is possible to easily set the viscosities of the first ink composition and the second ink composition to within the desired ranges by, for example, adjusting the content of the organic solvent, the thickener, and the resin described above and selecting the appropriate types of organic solvent, thickener, and resin. Here, in a case where a thickener is used in order to increase the viscosity of the ink, since it is possible to reduce the use amount of the organic solvent, high speed recording is possible in accordance with the improvement in the drying property of the ink. On the other hand, in a case where an organic solvent is used in order to increase the viscosity of the ink, the discharge stability of the ink is improved since it is possible to suppress thickening of the ink in the vicinity of the nozzles of the ink jet recording apparatus. In this manner, it is possible to appropriately select the material to be used in order to increase the viscosity of the ink according to the characteristics which are required.

1.4.2. Sedimentation

When each of the first coloring material and the second coloring material described above are dispersed in the same solvent, the settling speed of the first coloring material may be 3 times or more the settling speed of the second coloring material, may be in a range of 3 times or more to 10 times or less faster, and, in particular, may be in a range of 4 times or more to 8 times or less faster. In this manner, even in a case where the settling speed of the first coloring material is quite fast at 3 times or more compared to the settling speed of the second coloring material, it is possible to suppress settling of the first coloring material in the first ink composition since the viscosity of the first ink composition is sufficiently high compared to the viscosity of the second ink composition. In addition, by the settling speed of the first coloring material to 10 times or less, it is possible to decrease the flow resistance in the ink supply path inside the ink jet recording apparatus and suppress a decrease in the discharging property of the discharge nozzles.

The settling speed described above is equivalent to the terminal velocity calculated using the Stokes formula. According to the Stokes formula, it is possible to calculate the terminal velocity of the particles (the coloring materials in the ink in the invention) which are included in the fluid (the solvent in the ink in the invention) using values such as the viscosity at 20° C. or the average particle diameter calculated using a dynamic light scattering method.

The density of the first ink composition may be 1.1 times or more higher than the density of the second ink composition, may be within a range of 1.1 times or more to 3 times or less higher, and, in particular, may be within a range of 1.2 times or more to 2 times or less higher. Here, when the density of the normal ink increases, there is a tendency for the coloring materials which are included as solid components to settle easily. However, by the first ink composition and the second ink composition having the viscosity relationship described above, it is possible to suppress the settling of the first coloring material which is included in the first ink composition even in a case where the density of the first ink composition is 1.1 times or more higher than the density of the second ink composition. In addition, by the density of the first ink composition being 3 times or less the density of the second ink composition, it is possible to decrease the flow resistance in the ink supply path inside the ink jet recording apparatus and suppress a decrease in the discharging property of the discharge nozzles.

2. Liquid Droplet Discharging Apparatus

The liquid droplet discharging apparatus according to the invention is provided with the ink set described above. Below, description will be given with an ink jet printer as an example of the liquid droplet discharging apparatus of the invention with reference to the diagrams. Here, to facilitate understanding of the structure of the ink jet printer according to the present embodiment, there are cases where the scale is changed as appropriate.

2.1. Apparatus Configuration

FIG. 1 is a diagram which schematically represents an ink jet printer 10 in the present embodiment. The ink jet printer 10 in the diagram has a substantially box-shaped exterior shape and a front surface cover 11 is provided in approximately the center of the front surface and a plurality of operation buttons 15 are provided in the vicinity thereof. The front surface cover 11 is pivotally supported at the rear end side and when the upper end side is brought forward, an elongated discharge port 12 where a recording sheet (a recording medium) 2 is discharged is revealed. In addition, a paper feeding tray 13 is provided on the back surface side of the ink jet printer 10. When the recording sheets are set in the paper feeding tray 13 and an operation button 15 is operated, after a recording sheet 2 is taken in from the paper feeding tray 13 and an image is recorded on the surface of the recording sheet 2 in an inner section, the recording sheet 2 is discharged from the discharge port 12.

In addition, an upper surface cover 14 is provided on the upper surface side of the ink jet printer 10. The upper surface cover 14 is pivotally supported at the far side and when the upper surface cover 14 is opened by being lifted to the front side, it is possible to confirm the state of the interior of the ink jet printer 10 or perform repairs or the like on the ink jet printer 10.

A carriage 20 which forms ink dots on the recording sheet 2 while moving forward and backward in the main scanning direction, a driving mechanism 30 which moves the carriage 20 forward and backward, and the like are mounted in the interior of the ink jet printer 10. The carriage 20 is provided with a recording head 22 where a plurality of discharge nozzles which discharge ink toward the recording sheet 2 are formed, a sub-tank where ink to be discharged is temporarily stored, and the like. Here, description will be given of the detailed configuration of the carriage 20 using other diagrams.

The ink which is discharged from the discharge nozzles which are formed in the recording head 22 is accommodated in a dedicated container referred to as an ink cartridge 40. Although detailed description will be given below, the ink cartridge 40 is mounted on an ink supply apparatus 50 which is provided at a separate position to the carriage 20 and the ink inside the ink cartridge 40 is supplied to the carriage 20 via the ink supply apparatus 50 and an ink tube 60. In addition, an air pump unit 70, which carries out driving when the ink inside the ink cartridge 40 is supplied to the carriage 20, is provided next to the ink supply apparatus 50. In the present embodiment, a case where the ink cartridge 40 is connected with the carriage 20 via the ink tube 60 is shown; however, without being limited thereto, the ink cartridge 40 may be mounted on the carriage 20 without going through the ink tube 60. In this manner, in a case where the ink cartridge 40 is mounted on the carriage 20, there are cases where the sub-tank is not necessary.

Here, in the ink jet printer 10 in the diagram, it is possible to record images using inks such as the first ink composition, the second ink compositions (cyan, magenta, yellow, and black), and the like and discharge nozzles are provided for each type of ink in the recording head 22 which is mounted on the carriage 20. Then, with respect to each of the discharge nozzles, the ink inside the corresponding ink cartridge 40 is supplied via the ink tubes 60 provided for each type of ink.

The driving mechanism 30 which moves the carriage forward and backward is configured by a timing belt 32 where a plurality of teeth are formed on the inner side, a driving motor 34 for driving the timing belt 32, and the like. A part of the timing belt 32 is fixed to the carriage 20 and when the timing belt 32 is driven, it is possible to move the carriage 20 forward and backward in the main scanning direction while being guided by a guide rail which extends in the main scanning direction and which is not illustrated. Here, in the present embodiment, description will be given of an example of a so-called serial head type ink jet recording apparatus; however, without being limited thereto, the ink jet recording apparatus according to the present embodiment may be a so-called line head type ink jet recording apparatus.

In addition, a region which is referred to as a home position is provided at a position other than the recording region where the carriage 20 moves in the main scanning direction and a maintenance mechanism which performs maintenance so that recording is able to be correctly performed is mounted at the home position. The maintenance mechanism is configured by a cap member 90 which forms a closed space so as to surround the discharge nozzles by being pressed onto a surface (a nozzle surface) where the discharge nozzles are formed on the bottom surface side (the side toward the recording sheet 2) of the recording head 22, a raising and lowering mechanism which is not shown in the diagram for raising and lowering the cap member 90 in order to press onto the nozzle surface of the recording head 22, a suction pump which is not shown in the diagram for creating negative pressure in the closed space formed by pressing the cap member 90 onto the nozzle surface of the recording head 22, and the like.

Furthermore, a paper feeding mechanism which is not shown in the diagram for feeding the recording sheet 2, a control section 92 which controls the overall operation of the ink jet printer 10, and the like are also mounted inside the ink jet printer 10. The operation of moving the carriage 20 forward and backward, the operation of feeding the recording sheet 2, the operation of discharging ink from a discharge nozzle 23, the operation of driving the maintenance mechanism such that correct recording is possible, and the like are all controlled by the control section 92.

Figure 2:
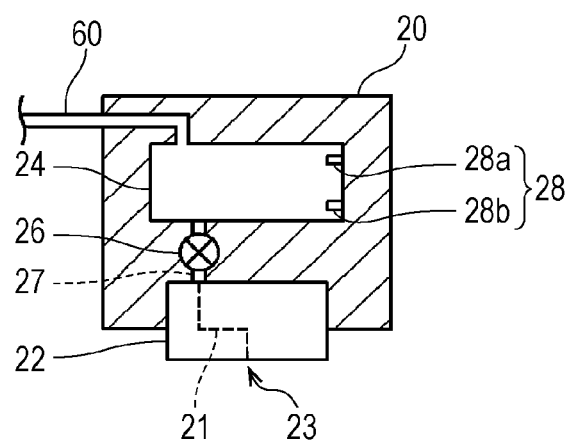
FIG. 2 is a diagram schematically illustrating a configuration of a carriage mounted in the ink jet printer according to an embodiment of the invention.

FIG. 2 is an explanatory diagram schematically illustrating a configuration of the carriage 20 mounted in the ink jet printer 10 of the present embodiment. As described above, the recording head 22, a sub-tank 24, and the like are provided in the carriage 20. The ink which is supplied from the ink cartridge 40 via the ink tube 60 is temporarily stored inside the sub-tank 24. The sub-tank 24 and the recording head 22 are connected via a self-sealing valve 26. The self-sealing valve 26 is a valve which is in an open state only when a predetermined negative pressure is applied to the recording head 22 and in a closed state when the predetermined negative pressure is not applied to the recording head 22. Therefore, by discharging ink from the discharge nozzle 23 which are formed on the bottom surface of the recording head 22, when the inside of the recording head 22 reaches a predetermined negative pressure, ink is introduced to the recording head 22 from the sub-tank 24 by opening the self-sealing valve 26. Here, as described above, five types of ink are used in the ink jet printer 10 of the present embodiment and the recording head 22, the sub-tank 24, and the self-sealing valve 26 are provided for each type of ink; however, only one type of ink is illustrated in FIG. 2.

The ink which is supplied to the recording head 22 is discharged from the opening section of the discharge nozzle and attached to the recording sheet 2. Due to this, a desired image is formed on the recording sheet. As the method for discharging the ink which is supplied to the recording head 22, it is possible to use the ink jet recording method. As the ink jet recording method, any method known in the related art may be used, for example, it is possible to use a method where a strong electric field is applied between the nozzle and an acceleration electrode placed in front of the nozzle, ink in the form of droplets is continuously discharged from the nozzle, and recording is carried out by applying a printing information signal to a polarization electrode while the ink droplets fly between the polarization electrodes or a method where discharging is carried out corresponding to the printing information signal without polarizing the ink droplets (an electrostatic attraction method), a method where ink droplets are forcibly discharged by applying pressure to the ink droplets with a small pump and mechanically vibrating the nozzle with a quartz oscillator or the like, a method where pressure and a printing information signal are applied at the same time to the ink with a piezoelectric element and the ink droplets are discharged and recorded (a piezo method), a method where the ink is heated and foamed by a small electrode according to a printing information signal and the ink droplets are discharged and recorded (a thermal jet method), or the like.

In addition, a liquid level sensor 28 is provided inside the sub-tank 24 and it is possible to detect the amount of ink inside the sub-tank 24. The liquid level sensor 28 is configured by an upper limit sensor 28a which detects that the liquid level of the ink is higher than an upper limit position which indicates that the sub-tank 24 is full of ink, and a lower limit sensor 28b which detects that the liquid level of the ink is lower than a lower limit position which indicates that there is little ink remaining inside the sub-tank 24.

Figure 3:
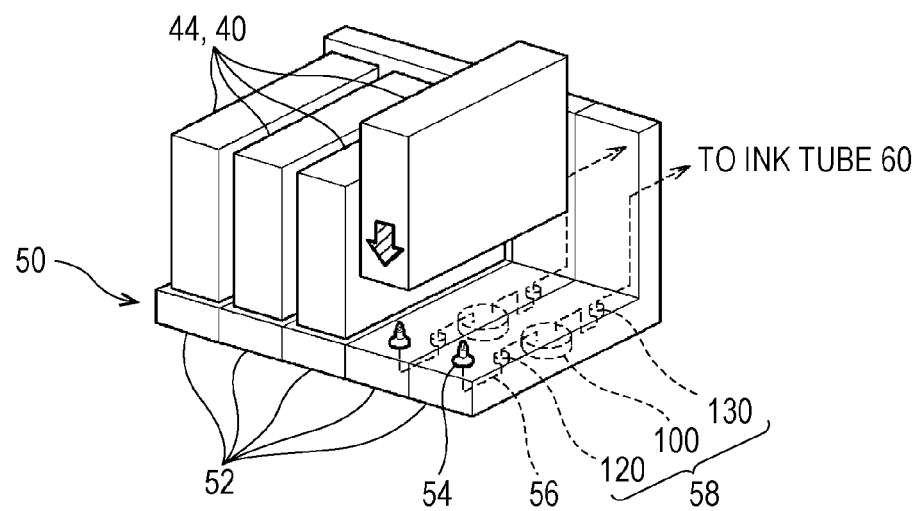
FIG. 3 is an explanatory diagram illustrating a manner of mounting an ink cartridge onto an ink supply apparatus according to an embodiment of the invention.

FIG. 3 is an explanatory diagram illustrating a manner of mounting the ink cartridge 40 onto the ink supply apparatus 50. As illustrated, ink introduction needles 54 for taking in ink from the ink cartridge 40 stand on the bottom section of the ink supply apparatus 50 for each of the ink cartridges 40. In addition, an ink supply port which is not shown in the diagram is provided in the bottom section of the ink cartridge 40. When the ink cartridge 40 is mounted on the ink supply apparatus 50, the ink cartridge 40 is mounted by being pushed downward in a state where the ink supply port which is provided in the ink cartridge 40 is pushed onto the ink introduction needle 54 which is provided in the ink supply apparatus 50. By so doing, it is possible to take in the ink inside the ink cartridge 40 to the ink supply apparatus 50 by inserting the ink introduction needle 54 from the ink supply port.

In addition, although described in detail below, the ink supply apparatus 50 of the present embodiment is configured by ink supply units 52 in the same number as the number of ink cartridges 40 which are mounted and the ink introduction needle 54 described above is provided for each of the ink supply units 52. An ink passage 56 is formed in the interior of the ink supply unit 52 and the ink which is taken in from the ink introduction needle 54 is guided to the ink tube 60 which is connected with the rear surface side of the ink supply unit 52 by the ink passage 56. A diaphragm pump 58 is provided on the ink passage 56 and the ink which is taken in from the ink introduction needle 54 is pumped toward the carriage 20 provided with the recording head 22.

The diaphragm pump 58 is generally configured by a pump section 100 provided with a diaphragm, a check valve (an upstream check valve 120) provided on the upstream side (the ink introduction needle 54 side) of the pump section 100, and a check valve (a downstream check valve 130) provided on the downstream side (the ink tube 60 side) of the pump section 100. Here, description will be given below of the detailed configuration of the diaphragm pump 58. In addition, in the present specification, in the ink passage 56, the side further upstream than the pump section 100 is referred to as an "upstream ink passage 56a" and the side further downstream than the pump section 100 is referred to as a "downstream ink passage 56b".

Figure 4:
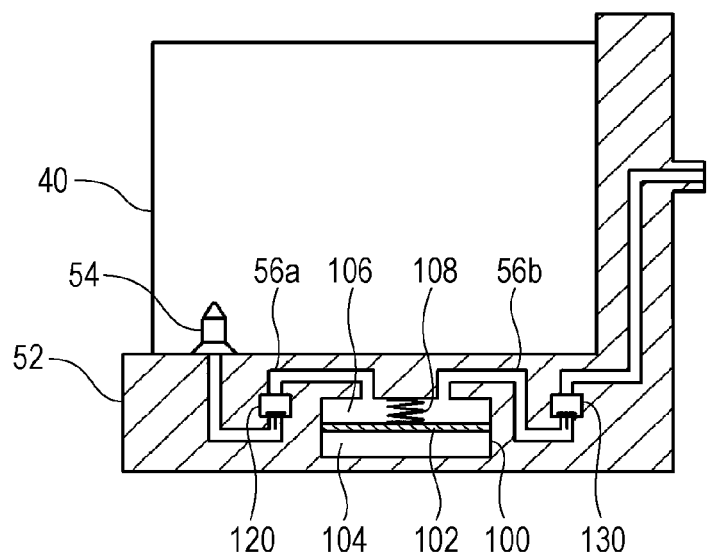
FIG. 4 is a cross-sectional diagram schematically illustrating a configuration of a diaphragm pump according to an embodiment of the invention.

FIG. 4 is a cross-sectional diagram schematically illustrating a configuration of the diaphragm pump 58 of the present embodiment. As described above, the diaphragm pump of the present embodiment is configured by the pump section 100 and the two check valves (the upstream check valve 120 and the downstream check valve 130), and the like. As shown in FIG. 4, the pump section 100 is provided with a diaphragm 102 formed of a flexible material through which gas such as air or liquid such as ink does not pass and, by the diaphragm 102 partitioning the pump section 100 into top and bottom, an ink chamber 106 is formed in the upper part of the diaphragm 102 and an air chamber 104 is formed in the lower part of the diaphragm 102.

In the ink chamber 106 formed in the upper part of the diaphragm 102, the upstream ink passage 56a which communicates with the ink introduction needle 54 and the downstream ink passage 56b which communicates with the ink tube 60 are connected. For this reason, the ink which is taken in from the ink introduction needle 54 is sent to the ink tube 60 through ink chamber 106. In addition, a spring 108 which pushes down the diaphragm 102 toward the air chamber 104 in the lower part is provided inside the ink chamber 106.

On the other hand, the air chamber 104 which is formed below the diaphragm 102 is connected with the air pump unit 70 (refer to FIG. 1) and, although detailed description will be given below, the air chamber 104 is pressurized by introducing air into the air chamber 104 by the action of the air pump unit 70. Although omitted from the diagrams, the air pump unit 70 is provided with a configuration such that it is possible to supply air to each of the ink cartridges 40. That is, it is possible to apply different pressures to each of the ink cartridges 40.

In addition, the upstream check valve 120 is provided in the upstream ink passage 56a and the downstream check valve 130 is provided in the downstream ink passage 56 b. These two check valves are valves which enter an opened state only in a case where ink flows from the upstream side (the ink introduction needle 54 side) to the downstream side (the ink tube 60 side). Accordingly, when the ink tries to flow back in the direction from the ink chamber 106 to the ink introduction needle 54, the upstream check valve 120 is in a closed state. In addition, when the ink tries to flow back in the direction from the ink tube 60 side to the ink chamber 106, the downstream check valve 130 is in a closed state. Thus, the flowing back of the ink is prevented in each case.

Figure 5:
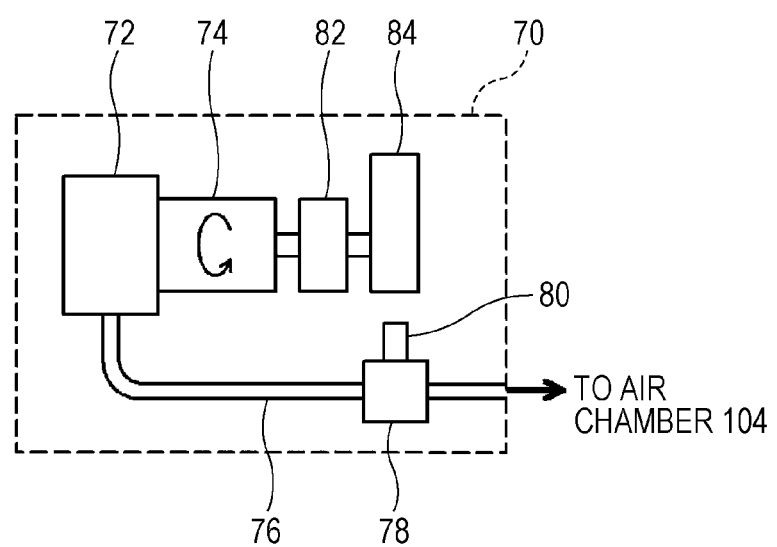
FIG. 5 is an explanatory diagram illustrating a configuration of an air pump unit according to an embodiment of the invention.

FIG. 5 is an explanatory diagram illustrating a configuration of the air pump unit 70 of the present embodiment. As illustrated, an air pump 72, a motor 74 which drives the air pump 72, and the like are provided inside the air pump unit 70. The air pump 72 of the present embodiment is a so-called rotary pump and air is pushed out toward a connecting tube 76 due to an eccentric rotor in the interior being rotated by the driving of the motor 74. Then, the air which is pushed out from the air pump 72 is supplied to the air chamber 104 of the diaphragm pump 58 after the pressure is adjusted by a regulator 78.

In addition, a cam 84 is attached to the motor 74 which drives the air pump 72 via a reduction gear 82. When the motor 74 is driven, the air chamber 104 is opened to the atmosphere by the cam 84 being rotated at constant periods and an atmosphere opening lever 80 which is provided in the regulator 78 being pushed down.

2.2. Supply of Ink

Figure 6A:
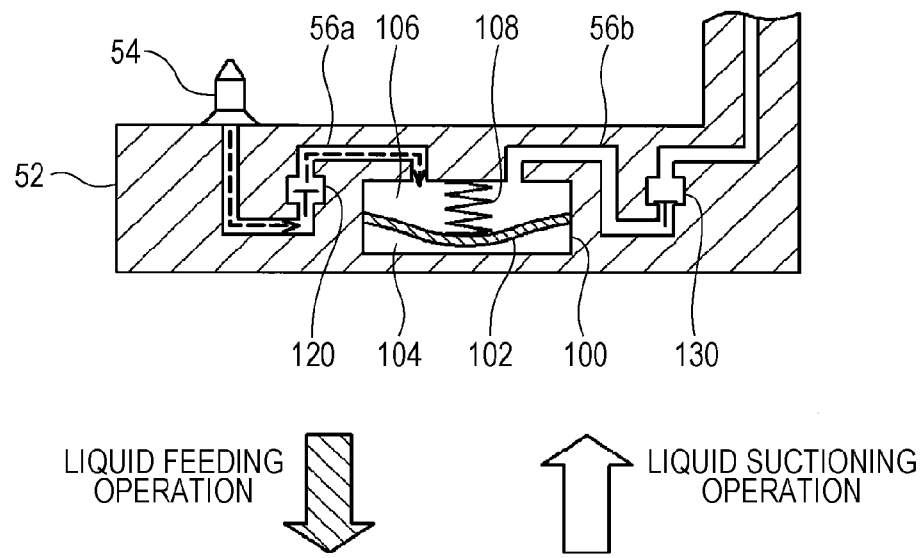
FIGS. 6A and 6B are explanatory diagrams illustrating an operation where the diaphragm pump supplies ink inside the ink cartridge to a carriage according to an embodiment of the invention.
Figure 6B:
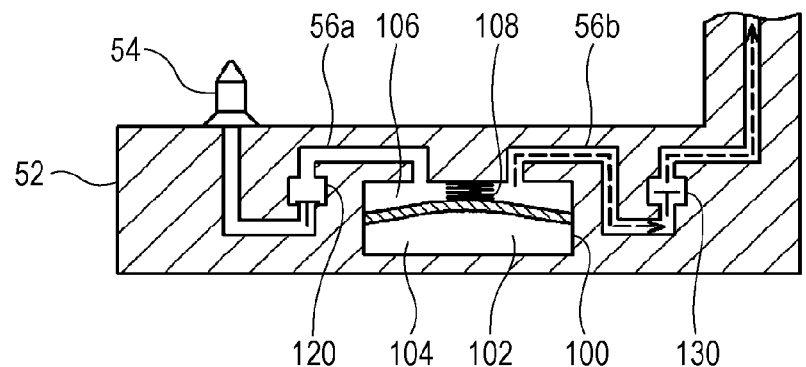

FIGS. 6A and 6B are explanatory diagrams illustrating an operation where the diaphragm pump 58 of the present embodiment supplies ink inside the ink cartridge 40 to the carriage 20. First, FIG. 6A illustrates a manner of suctioning ink inside the ink cartridge 40 into the ink chamber 106. As described above, the spring 108 is provided inside the ink chamber 106 and the spring 108 is attached in a state of being compressed from the free length thereof. Therefore, the diaphragm 102 increases the volume of the ink chamber 106 by changing shape so as to be pushed in to the air chamber 104 side due to the restoring force of the spring 108.

The upstream ink passage 56a and the downstream ink passage 56b described above are connected in the ink chamber 106, and when the volume of the ink chamber 106 increases, an ink flow is generated in the two ink passages so as to flow into the ink chamber 106. Among these, in the upstream ink passage 56a, the ink which is taken in from the ink introduction needle 54 is suctioned into the ink chamber 106 via the upstream check valve 120 by the upstream check valve 120 which allows the inflow of the ink to the ink chamber 106 being in an opened state. In contrast to this, in the downstream ink passage 56b, the downstream check valve 130 which prevents the inflow of ink to the ink chamber 106 is in a closed state and it is possible to suppress the ink from flowing back from the ink tube 60 side toward the ink chamber 106. Here, in FIG. 6A, the manner in which the ink which is taken in from the ink introduction needle 54 flows into the ink chamber 106 via the upstream check valve 120 is illustrated by a dashed arrow.

When air is introduced to the air chamber 104 due to the driving of the air pump 72 in a state where ink is suctioned into the ink chamber 106 due to the force of the spring 108 in this manner, since the pressure inside the air chamber 104 increases, as shown in FIG. 6B, the diaphragm 102 is pushed back to the ink chamber 106 side against the force of the spring 108 and the volume of the ink chamber 106 is reduced. As a result, an ink flow is generated so as to flow out from the ink chamber 106 to the upstream ink passage 56a and the downstream ink passage 56b.

At this time, in the upstream ink passage 56a, it is possible to suppress the ink from flowing back from the ink chamber 106 toward the ink introduction needle 54 since the upstream check valve 120 is in a closed state which prevents the outflow of ink from the ink chamber 106. On the other hand, in the downstream ink passage 56b, the downstream check valve 130 which allows the outflow of ink from the ink chamber 106 is in an opened state, and the ink which is pushed out from the ink chamber 106 is pumped toward the carriage 20 which is connected by the ink tube 60 via the downstream check valve 130. Here, in FIG. 6B, the manner in which the ink which is pushed out from the ink chamber 106 is pumped to the carriage 20 via the downstream check valve 130 is illustrated by a dashed arrow.

In addition, as described above, the cam 84 is attached (refer to FIG. 5) to the motor 74 which drives the air pump 72 via the reduction gear 82 and the air chamber 104 is opened to the atmosphere by the cam 84 pushing down the atmosphere opening lever 80 at constant periods. When the pressure inside the air chamber 104 return to atmospheric pressure, the diaphragm 102 is pushed to the air chamber 104 side again due to the restoring force of the spring 108 and the ink which is taken in from the ink introduction needle 54 is suctioned into the ink chamber 106 (refer to FIG. 6A). After that, by the air pump 72 pressurizing the air chamber 104 and pushing the diaphragm 102 to the ink chamber 106 side, the ink is pumped from the ink chamber 106 toward the carriage 20 (refer to FIG. 6B). By repeating this operation, it is possible to supply the ink inside the ink cartridge 40 to the carriage 20.

As described above, the first ink composition has a higher viscosity than the second ink composition. Since the fluidity of the ink decreases along with the increase in the viscosity of the ink, the ink jet printer according to the present embodiment is preferably provided with a structure which increases the flow of the first ink composition. In detail, the area of the cross-section of the first ink supply path which circulates the first ink composition is preferably larger than the area of the cross-section of the second ink supply path which circulates the second ink composition. Due to this, since the first ink composition easily circulates in the ink flow path, the flow of the first ink composition increases. Here, the first ink supply path is an ink supply path which connects the discharge nozzle 23 with an ink cartridge 42 in the present embodiment and the second ink supply path is an ink supply path which connects the discharge nozzle 23 with an ink cartridge 44 in the present embodiment. The cross-sectional area of the first ink supply path is preferably in a range of 1.2 times or more to 5 times or less with respect to the cross-sectional area of the second ink supply path. The cross-sectional area of the first ink supply path is more preferably 1.5 times or more to 3 times or less with respect to the cross-sectional area of the second ink supply path.

Due to this, it is possible to preferably satisfy both of a favorable ink flow and the compact property in the supply path inside the apparatus.

The ink supply path in the invention refers to a path where the ink which is supplied inside the ink jet apparatus is circulated up to the discharge nozzles when an ink storing container (the ink cartridge 40 in the present embodiment) which stores ink is connected with the ink jet recording apparatus. In detail, the ink supply path in the present embodiment is the ink passage 56 which connects the ink introduction needle 54 with the ink tube 60 inside the ink supply unit 52 (refer to FIG. 3 and FIG. 4), the ink tube 60 which connects the ink passage 56 (the downstream ink passage 56b) and the sub-tank 24 (refer to FIG. 2 and FIG. 3), a flow path 27 which connects the sub-tank 24 and the recording head 22 (refer to FIG. 2), and a flow path 21 inside the recording head 22 up to the opening of the discharge nozzle 23 which is connected with the flow path 27 (refer to FIG. 2).

Here, the space for temporarily storing the ink (the ink chamber 106, the sub-tank 24, and the like) is part of the path for circulating the ink; however, the space is excluded from the definition of the ink supply path. This is because, since the space which temporarily stores the ink has a sufficiently large cross-sectional area in comparison with the ink supply path described above, it is unlikely to be a factor blocking the circulation of the ink.

In the invention, the comparison of the area of the cross-section of the first ink supply path and the area of the cross-section of the second ink supply path is performed at the same location. In detail, in order to compare the area of the cross-section of the ink tube 60 of the first ink supply path and the area of the cross-section of the ink tube 60 of the second ink supply path, the cross-sectional areas are compared for each of the members.

It is possible to set the length of the first ink supply path to 0.5 times or more to 2.0 times or less the length of the second ink supply path. Due to this, it is possible to reduce changes in the configuration of the apparatus of the ink jet printer.

From the point of view of increasing the flow of the first ink composition in the ink supply path, the pressurization of the first pump unit is preferably greater than the pressurization of the second pump unit. Here, the first pump unit is equivalent to the pump unit 70 for circulating the first ink composition and the second pump unit is equivalent to the pump unit 70 for circulating the second ink composition. It is possible to confirm the magnitude relationship of the pressurization of the pump units by measuring the supply amount (ml/s) per unit of time under the same conditions for the different pump units.

As described above, since the viscosity of the first ink composition is high in comparison with the viscosity of the second ink composition, in a case where both ink compositions are discharged with the same discharge output, the discharge amount of the first ink composition may be lower than the discharge amount of the second ink composition. Then, in order to improve the discharge property of the first ink composition, the discharge output of the discharge nozzles when the first ink composition is discharged is preferably larger than the discharge output of the discharge nozzles which discharge the second ink composition.

Here, in a case where an ink jet recording method using a piezoelectric element is adopted as the method for discharging the ink, it is possible to increase the discharge output of the discharge nozzles by increasing the volume (that is, the displacement volume) when pressure is applied to a pressure chamber which is provided inside the recording head. In more detail, it is possible to change the displacement volume by changing the material of the piezoelectric material, the structure of the piezoelectric element, a driving potential difference, a driving waveform, and the like.

In addition, in order to improve the discharge property of the first ink composition, the nozzle diameter of the discharge nozzle which discharges the first ink composition is preferably larger than the nozzle diameter of the discharge nozzle which discharges the second ink composition.

In the present embodiment, a method for pressurizing and pumping the ink using a diaphragm pump is shown as the method for supplying the ink to the carriage; however, the method (the mechanism) of supplying the ink to the carriage is not limited to including the first pump unit and the second pump unit. For example, it is possible to use a method which is known in the related art other than the diaphragm type pump described above as the method for supplying the ink and examples thereof include methods for pumping the ink by applying pressure to the flow path which circulates the ink with a plunger type pump (refer to JP-A-2007-105994), a tube pump (refer to JP-A-2011-110850), a rotary-type pump, a gear-type pump, a snake-type pump, or the like. In addition, in a type which stores the ink pack inside the ink cartridge which stores the ink, it is possible to use a method or the like which pumps ink by pressurizing the ink pack by introducing air between the ink pack and the ink cartridge. These methods may be used alone or may be used in a combination.

3. Examples

Below, detailed description will be given of the invention using Examples and Comparative Examples; however, the invention is not limited to these Examples.

3.1. Preparation of Ink
3.1.1. First Ink Composition (White Ink Composition and Photoluminescent Ink Composition)
Preparation of Dispersion Containing White Coloring Material (Second Particles A)

First, titanium dioxide nanoparticles (trade names "MT-700B", manufactured by Tayca Corp., average particle diameter 80 nm) were prepared as the first particles, these particles were added into an aqueous medium (a medium where water and hexametaphosphate were mixed at 1:10), mixing and stirring were carried out at 25° C. for 2 hours, and a slurry solution containing 20 mass % of the titanium dioxide nanoparticles in terms of solid content was obtained.

83.7 g of zirconium chloride 8 dihydrate were added to the slurry solution, the pH was adjusted to 4.0 to 4.5 by slowly adding a sodium hydroxide aqueous solution, and stirring was carried out for two hours in this state. The obtained slurry solution was filtered and the solid content was extracted and dried.

Next, the second particles (porous titanium dioxide particles) were obtained by arranging the dried solid content in an electric furnace, increasing the temperature from room temperature up to 600° C. at 5° C./min, and carrying out firing at 600° C. for two hours. Then, a crushing and dispersing process was performed on the obtained second particles in water by using a wet bead mill, and a dispersion including the second particles A with an average particle diameter of 300 nm was obtained.

Here, the average particle diameter of the second particles A is a volume average particle diameter measured using Microtrac UPA (manufactured by Nikkiso Co., Ltd.). In addition, it was understood that the second particles had a rutile crystal structure when the crystal structure of the second particles diameter A was measured using a powder X-ray analysis apparatus (product name "Rigaku Multi-Flex", CuKα rays: 1.5418 angstroms).

Preparation of Dispersion Containing White Coloring Material (Second Particles B)

The second particles B were created in the same manner as in the preparation of the second particles A described above except that titanium dioxide nanoparticles (trade name "JA-1", manufactured by Tayca Corp., average particle diameter 180 nm) were used as the first particles. In this manner, a dispersion including the second particles B was obtained. The average particle diameter of the second particles B was measured in the same manner as the second particles A and was 350 nm. In addition, the crystal structure of the second particles B was measured in the same manner as the second particles A and had an anatase crystal structure.

Preparation of Water-Resistant Aluminum Pigment Dispersion

A resin layer coating liquid formed of cellulose acetate butyrate (butyl content 35-39%, manufactured by Kanto Chemical Co., Ltd.) 3.0 mass % and diethylene glycol diethyl ether (manufactured by Nippon Nyukazai Co., Ltd.) 97 mass % was uniformly coated onto a PET film with a film thickness of 100 μm using a bar coating method, and a resin layer thin film was formed on the PET film by drying for 10 minutes at 60° C. Then, using a vacuum deposition apparatus ("VE-1010 vacuum deposition apparatus", manufactured by Vacuum Device Inc.), an aluminum vapor-deposited layer with an average film thickness of 20 nm was formed on the resin layer described above. Next, peeling, miniaturization, and dispersion processes were performed at the same time on a laminate body formed with the method described above in diethylene glycol diethyl ether using a VS-150 ultrasonic dispersing machine (manufactured by AS ONE Corp.), and an aluminum pigment dispersion was prepared with a total ultrasonic dispersion processing time of 12 hours. A filtration process was performed with an SUS mesh filter with openings of 5 μm on the obtained aluminum pigment dispersion and coarse particles were removed. Next, the filtrate was placed into a round bottom flask and the diethylene glycol diethyl ether was evaporated using a rotary evaporator. Due to this, after the aluminum pigment dispersion was concentrated, the density of the aluminum pigment dispersion was adjusted, and an aluminum pigment dispersion with 5.0 mass % was obtained.

Next, by adding 5 parts by mass of the obtained aluminum pigment dispersion (containing 0.25 parts by mass of the aluminum pigment) to a beaker, adding 0.57 parts by mass of tetraethoxysilane (TEOS) and 0.1 parts by mass of 1 mol/L aqueous ammonia as a basic catalyst thereto, and carrying out stirring for one day at room temperature, hydrolytic condensation was caused. Due to this, an aluminum pigment dispersion containing an aluminum pigment (a water-resistant aluminum pigment) where a silica film was formed on the surface was obtained.

Next, the above aluminum pigment dispersion was subjected to centrifugation (10,000 rpm for 60 minutes) and at least a part of the diethylene glycol diethyl ether which was included in the aluminum pigment dispersion which was the supernatant thereof was removed.

Next, by adding ion-exchanged water and triethanolamine and stirring for one day at room temperature, a water-resistant aluminum pigment dispersion A was obtained. The composition of the water-resistant aluminum pigment dispersion A obtained in this manner was 5.0 mass % of water-resistant aluminum pigment, 93.4 mass % of water, and 1.6 mass % of triethanolamine.

The average particle diameter of the water-resistant aluminum pigment obtained in this manner was 0.9 μm. Here, the average particle diameter of the water-resistant aluminum pigment was the average particle diameter R50 measured using a flow-type particle image analyzer FPIA-2100.

In addition, when the specific gravity of the water-resistant aluminum pigment with respect to water (4° C.) at a measurement temperature of 25° C. was measured using a specific gravity meter (trade name "DMA-220 H", manufactured by Shinko Denshi Co., Ltd.), the specific gravity was 2.5.

Preparation of First Ink Composition

So as to achieve the compositions in Table 1, each of the components were mixed and stirred to achieve the compositions in Table 1 using the dispersion containing the first coloring material obtained in the manner described above. In this manner, the first ink compositions (white ink compositions W1 to W7 and photoluminescent ink compositions Me1 and Me2) were obtained. In addition, the densities of the obtained first ink compositions were measured using a density meter (trade name "DMA-4500", manufactured by Anton Paar GmbH) and the results are illustrated in Table 1.

Out of the components described in Table 1, those described other than the compound names are as follows. In addition, in Table 1, the content of the pigment and the resin emulsion is a value in terms of the solid content.

Second Particles A (refer to the preparing method described above, porous titanium dioxide particles)

Second Particles B (refer to the preparing method described above, porous titanium dioxide particles)

Densely charged titanium dioxide (trade name "Nano Tek Slurry", manufactured by C. I. Kasei Co., Ltd., average particle diameter 300 nm, dispersion solid content 10%)

Water-Resistant Aluminum Pigment (refer to the preparation method described above)

BYK-348 (trade name, manufactured by BYK Corp., silicone-based surfactant)

Resin Emulsion (trade name "Resamine D-1060", manufactured by Dainichiseika Color & Chemicals Mfg. Co., Ltd., solid content 40%)

3.2. Second Ink Composition (Color Ink Composition)

The second ink composition (a cyan ink composition C) was obtained by mixing and stirring of each of the components in the mixing amounts in the Table 2, carrying out filtering with a metal filter with a pore diameter of 5 μm, and carrying out a degassing process using a vacuum pump. In addition, the density of the second ink composition was measured using a density meter (trade name "DMA-4500", manufactured by Anton Paar GmbH) and is illustrated in Table 2.

Out of the components described in Table 2, those described other than the compound names are as follows. In addition, in Table 2, the content of the pigment and the resin emulsion is a value in terms of the solid content.

Pigment Blue 15: 3 (C.I. Pigment Blue 15:3, cyan pigment, average particle diameter 100 nm)

BYK-348 (trade name, manufactured by BYK Corp., silicone-based surfactant)

Resin Emulsion (trade name "Resamine D-1060", manufactured by Dainichiseika Color & Chemicals Mfg. Co., Ltd., solid content 40%)

TABLE 2

| Second Ink Composition | | C |
|---|---|---|
| Coloring Material | Pigment Blue 15:3 | 3 |
| Organic Solvent | 1-2 hexane diol | 3 |
| | Glycerine | 10 |
| | Trimethylol propane | 10 |
| Surfactant | BYK-348 | 0.5 |
| Resin | Resin emulsion | 0.5 |
| Water | Ion-exchanged water | Remainder |
| Total (Mass %) | | 100 |
| Density (g/cm$^3$) | | 1.052 |
| Evaluation Results | Viscosity (20° C.) Pa · s | 2.5 |
| | Sedimentation | A |
| | Clogging property | A |

3.3. Evaluation Test 3.3.1. Viscosity

The viscosities of each of the ink compositions obtained as described above were measured. The measurement of the

TABLE 1

| | First Ink Composition | W1 | W2 | W3 | W4 | W5 | W6 | W7 | Me1 | Me2 |
|---|---|---|---|---|---|---|---|---|---|---|
| Coloring Material | Second particles A (porous titanium dioxide) | 10 | 10 | 10 | 10 | 10 | | | | |
| | Second particles B (porous titanium dioxide) | | | | | | 10 | | | |
| | Water-resistant aluminum pigment | | | | | | | | 2 | 2 |
| | Densely charged titanium dioxide | | | | | | | 10 | | |
| Organic solvent | 1-2 hexane diol | 3 | 3 | 3 | 3 | 3 | 3 | 3 | 4 | 4 |
| | Glycerine | 10 | 10 | 10 | 10 | 10 | 10 | 10 | 15 | 10 |
| | Trimethylol propane | 20 | 10 | 1 | 10 | 10 | 10 | 10 | 10 | 10 |
| Surfactant | BYK-348 | 0.5 | 0.5 | 0.5 | 0.5 | 0.5 | 0.5 | 0.5 | 0.5 | 0.5 |
| Resin | Resin emulsion | 8 | 5 | 4 | 3.7 | 3 | 5 | 4.5 | 0.5 | 0.5 |
| Water | Ion-exchanged water | Remainder | Remainder | Remainder | Remainder | Remainder | Remainder | Remainder | Remainder | Remainder |
| | Total (Mass %) | 100 | 100 | 100 | 100 | 100 | 100 | 100 | 100 | 100 |
| | Density (g/cm$^3$) | 1.212 | 1.163 | 1.122 | 1.112 | 1.075 | 1.155 | 1.162 | 1.098 | 1.087 |
| Evaluation Result | Viscosity (20° C.) Pa · s | 8 | 4 | 3.5 | 3 | 2.5 | 4 | 4 | 4 | 2.5 |
| | Sedimentation | A | A | B | C | D | A | D | A | D |
| | Clogging property | B | A | A | A | A | A | A | A | A |
| | Bleeding property (First ink -> Color printing) | A | A | A | B | C | A | A | A | B | viscosity was carried out by maintaining the temperature of the ink at 20° C. using a vibration viscometer VM-100AL (manufactured by Yamaichi Electronics Co., Ltd.).

3.3.2. Sedimentation

After leaving each of the ink compositions obtained as described above to stand for one week in a constant temperature chamber at 20° C. and weighing 4 g of the supernatant thereof, dilution was carried out in a 1 L measuring flask. Furthermore, the diluted solution was weighed in a 5 mL transfer pipette and diluted in a 100 mL measuring flask. A absorbance WA of the liquid at a wavelength of 500 nm and an absorbance W0 when the ink composition described above was diluted in the same manner before being left to stand were measured and a sedimentation rate S was calculated using the following calculation formula.

Sedimentation rate $S(\%)=[1-\text{absorbance } WA)/(\text{absorbance } W0)]\times 100$ Thus, the ink stability was evaluated based on the following evaluation criteria for each calculated sedimentation rate S (%).

A: less than 10%
B: 10% or more to less than 30%
C: 30% or more 3.3.3. Clogging

The first ink composition and the second ink composition obtained as described above were set as the ink set and mounted on an ink jet printer (trade name "PX-W8000", manufactured by Seiko Epson Corp.). After that, after confirming that the ink composition was discharged from all of the nozzles for each of the ink sets, each of the ink sets was left to stand for one week in an environment of 40° C. at a position outside the home position (in a state where a recording head is shifted from the position of a cap which is provided in the printer and the recording head is not capped) in a state where there was no ink cartridge. After being left to stand, the ink composition was discharged from all of the nozzles again, the number of times of cleaning which were necessary until printing equal to initial printing was possible was measured, and the results were determined based on the following criteria. Here, the discharging of the first ink composition was performed using a waveform of a driving voltage which was higher than that of the second ink composition.

A: A case where printing equal to initial printing was obtained by cleaning three times or less
B: A case where printing equal to initial printing was obtained by cleaning 4 times or more to 9 times or less
C: A case where printing equal to initial printing was not possible even by cleaning 10 times or more 3.3.4. Bleeding The first ink composition and the second ink composition obtained as described above were set as the ink set and mounted on an ink jet printer (trade name "PX-W8000", manufactured by Seiko Epson Corp.). Then, images formed of the first ink composition and the second ink composition were formed on the recording medium (trade name "Clear Proof Film" manufactured by Seiko Epson Corp.). The recording (white to color printing) was performed in a PX-W8000 table printing mode. In detail, after a first image formed of the first ink composition was formed, a second image formed of the second ink composition was formed on the first image. As the print pattern for each of the images, a filled pattern which was able to printed at 100% duty at a resolution of 720 dpi horizontally and 720 dpi vertically was formed. Here, the evaluation was performed in a laboratory at room temperature (25° C.)

A: Bleeding was not visually recognized at a boundary section between the first image and the second image
B: Bleeding was slightly visually recognized at a boundary section between the first image and the second image
C: Bleeding was visually recognized at a boundary section between the first image and the second image 3.4. Evaluation Results The results of the evaluation tests above are illustrated in Table 1 and Table 2.

For W1 to W3, W6, and Me1 out of the first ink compositions, a white coloring material formed of second particles with an average particle diameter of 200 nm or more to 1 μm or less formed by collecting a plurality of first particles with an average particle diameter of less than 200 nm, or a photoluminescent pigment with a specific gravity of 2.0 or more was used as the coloring material. Furthermore, as illustrated in Table 1, the viscosity of W1 to W3, W6, and Me1 was 1.3 times or more with respect to the viscosity of the second ink composition C. It was understood that, when using an ink set using the first ink composition containing a specific coloring material and including a second composition provided with a specific viscosity relationship with the first ink composition, in addition to it being possible to reduce sedimentation and clogging in the nozzles, it was also possible to reduce bleeding in the recorded image.

On the other hand, the viscosity of W4, W5, and Me2 out of the first ink compositions was less than 1.3 times with respect to the viscosity of the second ink composition C. It was illustrated that, when using an ink set where the viscosity relationship between the first ink composition and the second ink composition was not within a specific range, in addition to decreasing the sedimentation of the first ink composition, bleeding was generated in the recorded images.

In addition, in W7 out of the first ink composition, a densely charged type titanium dioxide pigment without a porous structure was used. It was illustrated that, when using an ink set of the first ink composition and the second ink composition which did not contain specific coloring materials, it was easy for the first ink composition to settle.

The invention is not limited to the embodiment described above and various modifications are possible. For example, the invention includes configurations which are substantially the same as the configuration described in the embodiment (for example, configurations with the same functions, methods, and results, or configurations with the same object and effects). In addition, the invention includes configurations where non-essential portions of the configuration described above in the embodiment are replaced. In addition, the invention includes configurations which exhibit the same action and effects as the configuration described in the embodiment or configurations where it is possible to achieve the same object. In addition, the invention includes a configuration where a well-known technique is added to the configuration described in the embodiment.

The entire disclosure of Japanese Patent Application No. 2013-221951, filed Oct. 25, 2013 is expressly incorporated by reference herein.

What is claimed is:
1. A liquid droplet discharging apparatus, comprising:
an ink set comprising:
    a first ink composition which contains a first coloring material; and
    a second ink composition which contains a second coloring material other than the first coloring material, wherein the first coloring material is at least one of a white coloring material formed of second particles with an average particle diameter of 200 nm or more to 1 μm or less formed by collecting a plurality of first particles with an average particle diameter of less than 200 nm, or a photoluminescent pigment with a specific gravity of 2.0 or more, and viscosity of the first ink composition at 20° C. is 1.3 times or more with respect to the viscosity of the second ink composition at 20° C.;

a first nozzle which discharges the first ink composition;

a first ink supply path which circulates the first ink composition;

a first pump unit which supplies the first ink composition to the first nozzle via the first ink supply path;

a second nozzle which discharges the second ink composition;

a second ink supply path which circulates the second ink composition; and a second pump unit which supplies the second ink composition to the second nozzle via the second ink supply path, wherein a surface area of a cross-section of the first ink supply path is larger than the surface area of a cross-section of the second ink supply path.

2. The liquid droplet discharging apparatus according to claim 1,
wherein the viscosity of the first ink composition at 20° C. is 3 times or less with respect to the viscosity of the second ink composition at 20° C.

3. The liquid droplet discharging apparatus according to claim 1,
wherein the density of the first ink composition is 1.1 times or more with respect to the density of the second ink composition.

4. The liquid droplet discharging apparatus according to claim 1,
wherein the first particles include a metal oxide.

5. The liquid droplet discharging apparatus according to claim 1,
wherein pressurization of the first pump unit is greater than the pressurization of the second pump unit.

6. The liquid droplet discharging apparatus according to claim 1,
wherein the discharge output of the first nozzle which discharges the first ink composition is larger than the discharge output of the second nozzle which discharges the second ink composition.

* * * * *